United States Patent [19]

Masaharu

[11] 4,069,469
[45] Jan. 17, 1978

[54] SYSTEM FOR COLLECTING INFORMATION IN WATER

[75] Inventor: Yosimura Masaharu, Tokyo, Japan

[73] Assignee: Oki Electric Industry Company, Ltd., Tokyo, Japan

[21] Appl. No.: 725,878

[22] Filed: Sept. 23, 1976

[30] Foreign Application Priority Data

Oct. 15, 1975 Japan .................................. 50-124131

[51] Int. Cl.² .......................................... H04B 11/00
[52] U.S. Cl. ................................................. 340/5 R
[58] Field of Search ....................... 340/4 R, 5 R, 3 T

[56] References Cited

U.S. PATENT DOCUMENTS 1,711,879  5/1929  Ehret .................................. 340/4 R
2,941,492  6/1960  Wilcoxon ........................... 340/5 R

FOREIGN PATENT DOCUMENTS 1,346,898  2/1974  United Kingdom ............... 340/4 R Primary Examiner—Richard A. Farley
Attorney, Agent, or Firm—Kenyon & Kenyon

[57] ABSTRACT

A submersible which can automatically move along the cable laid under water, has a sensor, and the information collected or gathered by said sensor is forwarded to the control unit on land through said cable. The submersible is for instance connected acoustically to said cable. The cable has a plurality of transducers at every predetermined length for sending the control signal from the cable to the submersible and receiving the information from the submersible.

4 Claims, 6 Drawing Figures

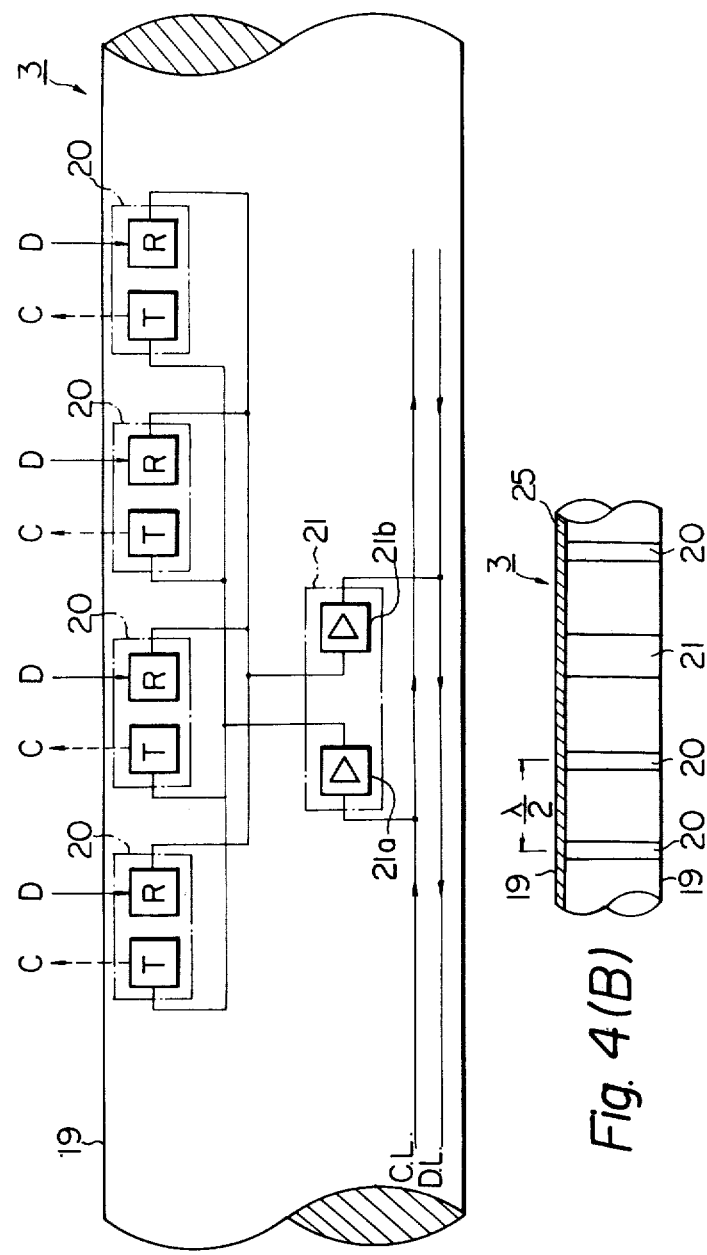

SYSTEM FOR COLLECTING INFORMATION IN WATER

BACKGROUND OF THE INVENTION

The present invention relates to a system for collecting or gathering information in water, in particular, relates to a system for collecting information concerning sound information from a ship on a sea surface or in water, water temperature, salinity, and/or the direction and speed of an ocean current.

According to the prior information collection system, a sensor or a detector is installed on a sea bottom and the sensor is connected through a cable to the apparatus on land. However, said prior art has the disadvantages that it is difficult to fix a sensor on a deep sea bottom, and that the sensor fixed on a sea bottom can not move.

According to the second prior information collection system, a sensor or a detector is installed on a buoy on a sea surface or under water and the obtained information is transmitted through wireless. However the second prior system has the disadvantages that it is difficult to supply the source power to the system for the long time operation, and that the buoy is unstable for the severe condition of the weather and the buoy can not be used many times.

According to the third prior information collection system, a sensor or a detector is installed in a ship navigating on the sea surface or under water. However, the third prior system has the disadvantage that the operation of the system is rather expensive and requires many hands.

SUMMARY OF THE INVENTION

It is an object, therefore, of the present invention to overcome the disadvantages and the limitations of the prior information collection system by providing a new and improved information collection system, in which the construction and the maintenance of the system are easy, a sensor or a detector is movable, and it is less expensive.

The above and other objects are attained by an information collection system comprising a signal cable laid under water connected to a control unit on land, and a submersible which can automatically move under water according to the control of said control unit through said cable. A sensor installed in the submersible collects the sea information, which is forwarded to the control unit on land through said cable.

BRIEF DESCRIPTION OF THE DRAWINGS

The foregoing and other objects, features and attendant advantages of the present invention will be appreciated as the same become better understood by means of the following description and the accompanying drawings wherein.

DESCRIPTION OF THE PREFERRED EMBODIMENT

Figure 1:
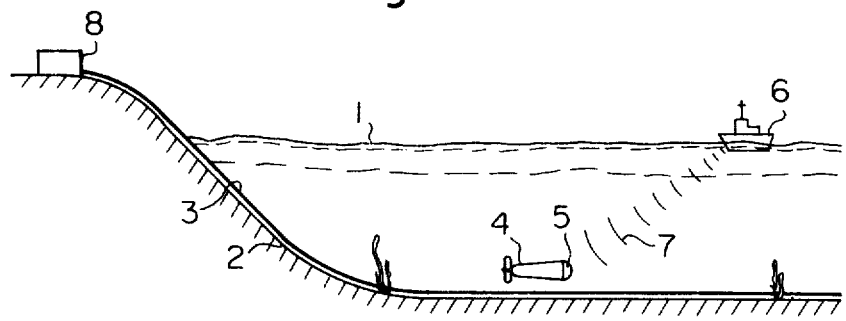
FIG. 1 shows the explanatory embodiment of the present invention.

FIG. 1 shows the embodiment of the present invention, in which the screw sound or the engine noise from a ship on a sea surface is collected. In FIG. 1, the reference numeral 1 is a sea surface, 2 is a sea bottom, 3 is a signal cable, 4 is a sub-mersible which can move in the sea water according to the control from the land, 5 is a sensor installed in said submersible 4, 6 is a ship, 7 is a sound wave from the ship 6, 8 is a control unit installed on the land for controlling the movement of said submersible 4 and receiving the information or data from said submersible 4.

The signal cable 3 is laid in the sea water or on the sea bottom covering the area to collect the information, and the submersible 4 goes along the cable 3 and collects the information concerning the sea noise. Of course the submersible 4 can stop beside the cable 3. The information collected by the sub-mersible 4 is transmitted to the control unit 8 or the land through the cable 3, and/or said information is recorded in the submersible 4. The propagation means of the control signal and the information between the cable 3 and the submersible 4 is, for instance, sound wave, electro-magnetic wave or laser beam. When the operation of the information collection system is finished, the submersible returns to the land according to the control of the control unit 8.

Figure 2:
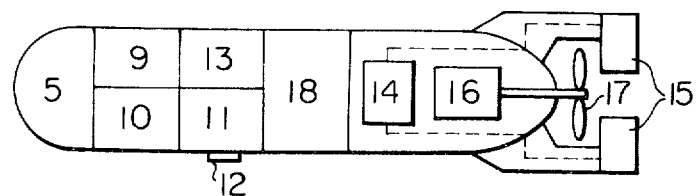
FIG. 2 shows the structure of the submersible 4 in FIG. 1.
Figure 3A:
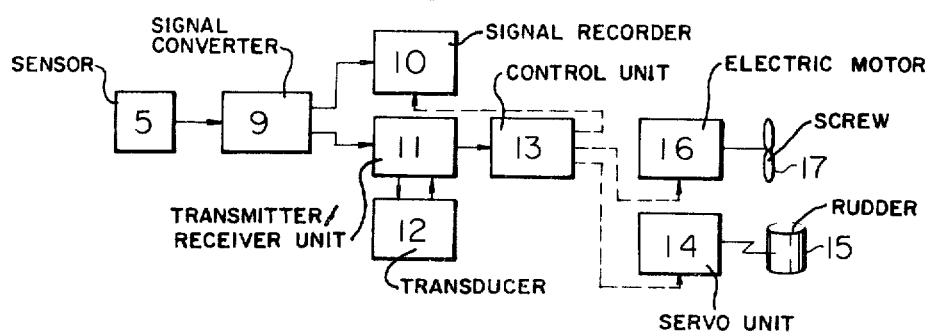
FIG. 3 (A) and FIG. 3 (B) show an electrical block-diagram of the submersible 4 in FIG. 1, and FIG. 4 (A) and FIG. 4 (B) show the structure and the electrical connections of a cable 3 in FIG. 1.
Figure 3B:
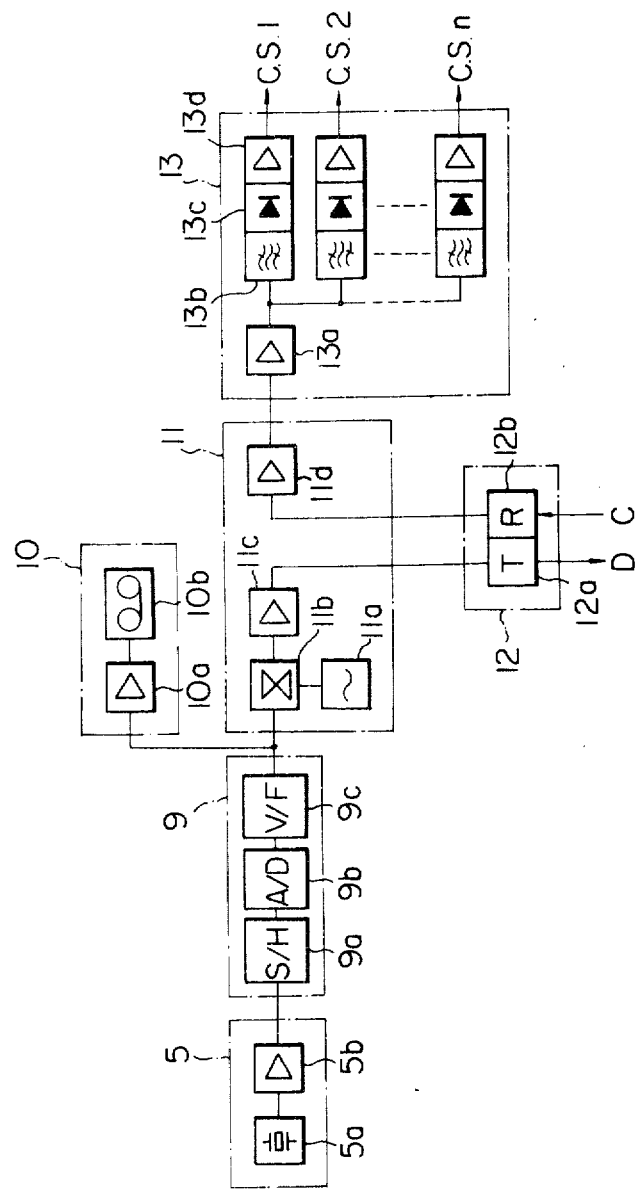

The structure and the electrical block-diagram of the submersible 4 are shown in FIG. 2, FIG. 3 (A) and FIG. 3 (B), in which the propagation means between the cable 3 and the submersible 4 is sound wave. In those figures, the reference numeral 5 is a sensor for converting the sound energy to the electrical signal, having a hydrophone 5a and a pre-amplifier 5b. 9 is a signal convertor for converting an analog signal from the sensor 5 to a frequency-shift signal. The convertor 9 comprises a sample hold circuit 9a, an analog-digital convertor 9b and a voltage-frequency convertor 9c. 10 is a signal recorder comprising an amplifier 10a and a recorder 10b, which can record on a magnetic tape the collected information. 11 is a transmitter/receiver unit having an oscillator 11a, a modulator 11b, a power amplifier 11c, and a pre-amplifier 11d. 12 is a transducer having a transmitter 12a and a hydrophone 12b. 13 is a control unit having an amplifier 13a, a filter 13b, a rectifier 13c and an amplifier 13 d. The control unit 13 provides a plurality of control signals CS1, CS2, — — — CSn for controlling the operation of the submersible. 14 is a servo unit, 15 is a rudder of the submersible, 16 is an electric motor for moving the submersible, 17 is a screw, and 18 is a battery for supplying the electric power to the electric devices in the submersible.

The information detected by the sensor 5 is sent to the signal recorder 10 and the transmitter/receiver 11 through the signal convertor 9. The transmitter/receiver 11 modulates the input signal, and thus, the modulated signal is forwarded to the transmitter 12a, which converts the input electric energy to the sound wave energy. The sound wave propagates to the cable 3 through the sea water. Thus the information detected by the sensor 5 is sent to the land through the submersible 4 and the cable 3.

On the other hand, the control signal from the control unit 8 on the land is received by the hydrophone 12b through the cable 3 and the sea water. The hydrophone converts the sound wave signal to the electric signal, which is applied to the control unit 13 through the pre-amplifier 11d. The control unit 13 provides one of the plurality of output signals CS1, CS2, — — — CSn according to the frequency of the input signal. The input signal of a particular frequency passes through the related band-pass filter and is rectified by the rectifier, therefore, the output signals CS1, CS2, — — — CSn are D. C. (direct current) signals. The controller 13 functions to start and stop the recorder 10b, to operate the rudder 15 through the servo unit 14, and to operate the motor 16 and the screw 17.

FIGS. 4 (A) and 4 (B) show the structure and the electrical connection of the cable 3, in which the reference numeral 19 is an outer surface of the cable, 20 is a plurality of transducers installed in the cable, 21 is a transmitter/receiver having the power amplifier 21a and the preamplifier 21b, C. L. is a control line, D. L. is a data line, and 25 is a steel wire for strengthening the cable. The length between each transducers 20 is preferably ($\lambda/2$), where $\lambda$ is the wave-length of the sound wave in the sea water.

The cable is filled with castor-oil in order to provide the non-air condition and facilitate the acoustic impedance matching between the cable and sea water. The control signal from the land is sent to the hydrophone (R) 12b of the submersible 4 through the control line C. L., the power amplifier 21a, the transmitter (T) in the transmitter/receiver 20 and the sea water. On the other hand, the information from the transmitter (T) 12a of the submersible 4 is forwarded to the land through the sea water, the hydrophone (R) in the transmitter/receiver 20, the preamplifier 21b and the data line 19. In order to avoid the interference between the transmitted sound wave and the received sound wave in the transmitter/receiver 20, it is preferable that the frequency of the sound wave from the cable is considerably different from that from the submersible.

Although the above embodiment concerns the system for the collection of the sea noise for the simplicity of the explanation, the present invention can be applicable not only to the sea noise collection system, but also to the information collection system including water temperature, the direction and the speed of the ocean current, pH, salinity, etc. Further, a television camera on a submersible would provide the picture on the sea bottom and/or under water. It should be appreciated that the present invention can be applicable to the information collection system also in a river and/or a lake.

According to the present invention, only a cable is always installed under water, and other devices, such as, for example, a computer, a recorder and/or power source for facilitating the collection of the information can be maintained on land. Therefore the operation and the maintenance of the system are very easy. The automatic operation of the system is also possible.

From the foregoing it will now be apparent that a new and improved information collection system has been found. It should be understood of course that the embodiment disclosed is merely illustrative and is not intended to limit the scope of the invention. Reference should be made to the appended claims therefore rather than the specification as indicating the scope of the invention.

What is claimed is:

1. A system for collecting information in water comprising a signal cable laid under water connected to a control unit on land, said cable having a plurality of hydrophones at every predetermined length, a submersible which can automatically move under water according to the control of said control unit through said cable, said submersible being acoustically connected to said cable, said submersible having a sensor for collecting the information in water, and said information collected by the sensor being forwarded to said control unit on land through said cable.

2. The invention as defined in claim 1, wherein the length between each hydrophone in said cable is ($\lambda/2$), where $\lambda$ is a wavelength of the sound wave in water.

3. The invention as defined in claim 1, wherein said submersible has a recorder for recording the collected information.

4. The invention as defined in claim 1, wherein said cable is filled with castor-oil.

* * * * *